US008526518B2

United States Patent
Feigin et al.

(10) Patent No.: US 8,526,518 B2
(45) Date of Patent: Sep. 3, 2013

(54) IMBALANCE COMPENSATION FOR DIRECT CONVERSION COMMUNICATION SYSTEMS

(75) Inventors: Jeffrey Ross Feigin, Andover, MA (US); David Paul Brady, Milton, MA (US)

(73) Assignee: Skyworks Solutions, Inc., Woburn, MA (US)

( * ) Notice: Subject to any disclaimer, the term of this patent is extended or adjusted under 35 U.S.C. 154(b) by 324 days.

(21) Appl. No.: 12/734,762

(22) PCT Filed: Dec. 18, 2008

(86) PCT No.: PCT/US2008/013826
§ 371 (c)(1),
(2), (4) Date: May 18, 2010

(87) PCT Pub. No.: WO2009/082457
PCT Pub. Date: Jul. 2, 2009

(65) Prior Publication Data
US 2010/0272208 A1    Oct. 28, 2010

Related U.S. Application Data

(60) Provisional application No. 61/008,175, filed on Dec. 18, 2007.

(51) Int. Cl.
*H04K 1/10* (2006.01)
(52) U.S. Cl.
USPC ........... 375/260; 376/260; 376/267; 376/299; 376/346; 376/349; 375/350

(58) Field of Classification Search
USPC .................. 375/260, 267, 299, 346, 349, 350
See application file for complete search history.

(56) References Cited

U.S. PATENT DOCUMENTS

| | | | |
|---|---|---|---|
| 2004/0203472 A1* | 10/2004 | Chien | 455/68 |
| 2005/0152476 A1* | 7/2005 | Coersmeier | 375/322 |
| 2005/0227642 A1* | 10/2005 | Jensen | 455/127.1 |
| 2008/0187038 A1* | 8/2008 | Currivan et al. | 375/233 |

* cited by examiner

*Primary Examiner* — Kabir A Timory
(74) *Attorney, Agent, or Firm* — Weide & Miller, Ltd.

(57) ABSTRACT

Most modern integrated circuit transceivers, especially wireless LAN, utilize a direct conversion radio architecture, which is highly advantageous from the perspectives of cost and flexibility, there exist several performance impairments, including gain and phase imbalances between the in-phase (I) and quadrature (Q) of a transmitter or receiver. Disclosed herein is a signal processing methodology and system for compensation of I/Q imbalance for a direct conversion packet-switched OFDM communications system. The imbalance, which accounts for transmitter I/Q imbalance, RX I/Q imbalance, phase/frequency error, and dispersive multipath fading. Both frequency dependent I/Q imbalance and frequency independent cases are considered, covering both wideband and narrowband modulation. The proposed estimation algorithms operate within the fully compliant framework of existing multi-user OFDM radio standards (WLAN, LTE, WimAX). These algorithms accurately estimate and correct transceiver I/Q imbalance on a packet-by-packet basis, all within the receiver's digital baseband.

23 Claims, 13 Drawing Sheets

IMBALANCE COMPENSATION FOR DIRECT CONVERSION COMMUNICATION SYSTEMS

PRIORITY CLAIM

This application claims priority to and the benefit under 35 U.S.C. §371 of PCT application number PCT/US2008/013826 filed Dec. 18, 2007 entitled Imbalance Compensation For Direct Conversion Communication Systems which claims priority to U.S. provisional patent application No. 61/008,175 filed Dec. 18, 2007 and entitled Joint Tx/Rx I/Q Imbalance Compensation for Direct Conversion OFDM in Multipath Environments.

FIELD OF THE INVENTION

The invention relates to wireless communication and in particular to a method and apparatus for correcting I/Q imbalance in a direct conversion radio system.

RELATED ART

With the rapidly growing consumer demand for broadband wireless data communications and broadcasting (including WIMAX, WLAN, UWB, DVB, DAB, DRM, etc.), wireless system OFDM modulation, which allows reduced cost and current consumption, while supporting high spectral efficiency through dispersive channels, is the predominant modulation format for such wireless communications systems. Similarly, the direct conversion radio transceiver architecture provides the potential for excellent current consumption, size, and radio performance, while inherently allowing a great degree of channel bandwidth flexibility. However, even properly architected (but un-calibrated) direct conversion architectures suffer from detrimental quadrature error. This problem is further exacerbated by the fact that unmitigated quadrature error causes equalizer channel estimation error that introduces further distortion to the intended waveform the simple OFDM equalization algorithm divides the frequency-domain received training sequence by that of the 'known' transmitted sequence.

Many OFDM systems utilize radio architectures exhibit little or no quadrature error, particularly those deployed by professional network service providers. However, most consumer electronic and type radio systems (such as WLAN and some forms of WIMAX) utilize direct conversion radios for both the transmitter and receiver. Furthermore, since the network timing and radio channel estimation sequences are extremely short (on the order of microseconds), such radio systems rely upon digital-domain signal processing to de-rotate the random phase/frequency error that exist between nodes. It is not usually practical to implement a direct conversion receiver that has a synchronous carrier reference ('near' direct conversion is the pragmatic solution) in packet-switched systems. Therefore, a generalized packet-based direct conversion communication system model accounts for the combined distortion effects that are the result of: 1) transmitter quadrature error, 2) dispersive multipath, 3) phase/frequency offset, and 4) receiver quadrature error, in which some of the parameters change on a packet-by-packet basis.

Various solutions have been proposed to overcome the drawback of the prior art as described above. On proposed solution is set forth in the following paper: *Joint Adaptive Compensation of TX and RX IQ Imbalance Under Carrier Frequency Offset in OFDM-Based Systems*, IEEE Trans, on Signal Proc., Vol. 55, No. 11, November 2007, by D. Tandur and M. Moonen. However this proposed solution assumes or requires time-invariant channels, which numerous environments are not. As such, this proposed solution does not overcome drawbacks in the proposed environment of use and the prior art.

SUMMARY

Disclosed herein is an analytical framework for the transmitter-receiver quadrature error problem in the presence of a phase/frequency error and multipath channel distortion in the context of standards-based OFDM modulation (Wireless LAN, WiMAX, LTE, et. al.). A low-complexity, training-based solution is derived and presented for the estimation of independent transmitter and receiver quadrature error parameters as well as the quadrature error-immune channel equalization estimate.

Disclosed herein is a method for imbalance compensation in a direct conversion communication system comprising receiving a signal via an antenna and then amplifying the signal to create an amplified signal. The amplified signal is provided to a mixer having a first input and a second input. Within the mixer, the operation converts the amplified signal to an imaginary baseband signal and a real baseband signal. This method then converts the imaginary baseband signal and the real baseband signal to a digital format to create an imaginary signal and a real signal. The method then processes the complex signal with a receiver quadrature correction module to restore quadrature amplitude and phase accuracy of the complex baseband waveform to create a receiver corrected waveform. Thereafter, the method processes the receiver corrected waveform to correct remote transmitter quadrature error In one embodiment, the method further comprising processing the corrected imaginary signal and the corrected real signal with a quadrature error estimation module to generate one or more receiver parameters and one or more transmitter parameters. In such an embodiment the receiver parameters are used by the receiver quadrature correction module and the transmitter parameters are used by the transmitter correction module. In one configuration processing by the transmitter correction module further comprises de-rotation for quadrature error. It is contemplated that processing by the transmitter correction module may further comprise equalization for remote transmitter quadrature error.

Also disclosed herein is a method for correcting imbalance between real and imaginary signals in a direct conversion receiver comprising receiving a real signal and an imaginary signal from a direct conversion receiver and performing quadrature correction on the real signal and the imaginary signal to create a corrected real signal and a corrected imaginary signal. This method then performs quadrature error estimation with a quadrature estimation module to generate one or more receiver parameters and one or more transmitter parameters. The method then receives the corrected real signal and a corrected imaginary signal at a transmitter correction module and processing the corrected real signal and the corrected imaginary signal by performing derotation and equalization on the corrected real signal and the corrected imaginary signal.

In one embodiment, the real signal and the imaginary signal are in a digital baseband format. It is contemplated that the step of performing quadrature correction may comprise utilization of a Linear Least Squares Estimation. In one embodiment performing derotation and equalization comprises performing receiver quadrature correction in line before CFO estimation. In this method, the direct conversion receiver may comprise a receiver operating in accordance with the 802.11 standard and which suffers from imbalance.

Another method disclosed herein comprises a method for correcting error in a direct conversion communication device. This method comprises receiving a one or more signals and performing receiver imbalance compensation comprising dividing the one or more signals by an 1 plus an amplitude error estimate and then rotate the result by a receiver phase error estimate to create one or more quadrature corrected signals. This method also comprises performing linear equalization on the one or more quadrature corrected signals to reduce the effects of channel distortion to create one or more equalized signals and performing derotation on the one or more equalized signals to achieve carrier frequency offset compensation to create one or more transmitter imbalanced signals. This method also performs transmitter imbalance compensation to reduce or remove transmitter imbalance.

In one embodiment performing transmitter imbalance compensation comprises dividing at least one of the one or more transmitter imbalanced signals by 1 plus a transmitter amplitude error estimate and shifting by a transmitter frequency error estimate. It is contemplated that the amplitude error is a function of gain error and that generating the receiver phase error estimate and the amplitude error estimate occurs within a transmit parameter channel estimation module. It is contemplated that the linear equalization occurs in the time domain or the frequency domain and that carrier frequency offset compensation may comprise tracking phase and frequency offset between a transmitter and a receiver.

Also disclosed herein is a system for correcting error in a direct conversion communication device. In one embodiment, this system comprises a direct conversion analog receiver configured to output a real signal and an imaginary signal. Also part of this system is a receiver quadrature correction module configured to process the real signal and the imaginary signal to reduce receiver imbalance to create one or more receiver imbalance corrected signals. Also part of this embodiment is a transmitter correction module configured to process the one or more receiver imbalance corrected signals to perform derotation and equalization.

In one embodiment, the receiver quadrature correction module and the transmitter correction module are embodied on a single integrated circuit. It is also contemplated that this system may further comprise an error estimation module configured to generate one or more error estimates, which are used by the receiver quadrature correction module and the transmitter correction module. For example, the one or more error estimates comprise a phase error estimate and an amplitude error estimate.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

A generalized packet-based direct conversion communication system model should account for the combination of: 1) transmitter I/Q imbalance, 2) dispersive multipath, 3) phase/frequency offset packet-by-packet basis. Disclosed herein is a novel system and method that considers the packet-switched scenario where multiple nodes communicate with one another. This method and apparatus is capable of estimating both transmitter and receiver I/Q imbalance parameters on a packet-by-packet basis in the presence of (or lack of) a phase/frequency error. This scenario exists in all 802.11 networks, where each received packet, whether from an intended or unintended source (because the channel is shared), has a possibly different transmitter I/Q imbalance and carrier frequency offset (CFO) parameters, which are preferably estimated and corrected during the training sequence. The estimation techniques disclosed herein, as well as their inherent partitioning of transmitter from receiver parameters, have unique implications and benefits not available in prior art solutions. These improvements include, but are not limited to an improved signal to noise-plus-interference ratio (SINR) due to the correction of the transmitted signal under the packet-switched scenario. Another improvement is the possibility to send 'advisory' packets to the transmitting station such that it can correct the transmitter I/Q imbalance. Yet another benefit is that the RECEIVER I/Q imbalance correction can be placed ahead of all other digital-domain signal processing algorithms. Also novel is that the low-rank problem (i.e., when CFO is small) is resolved using previously estimated receiver parameters to reduce the rank of the estimate. Finally, this particular usage of a preamble-only technique itself is novel, in that it allows the necessary joint transmitter and receiver parameterization under these packet-switched circumstances.

Figure 1:
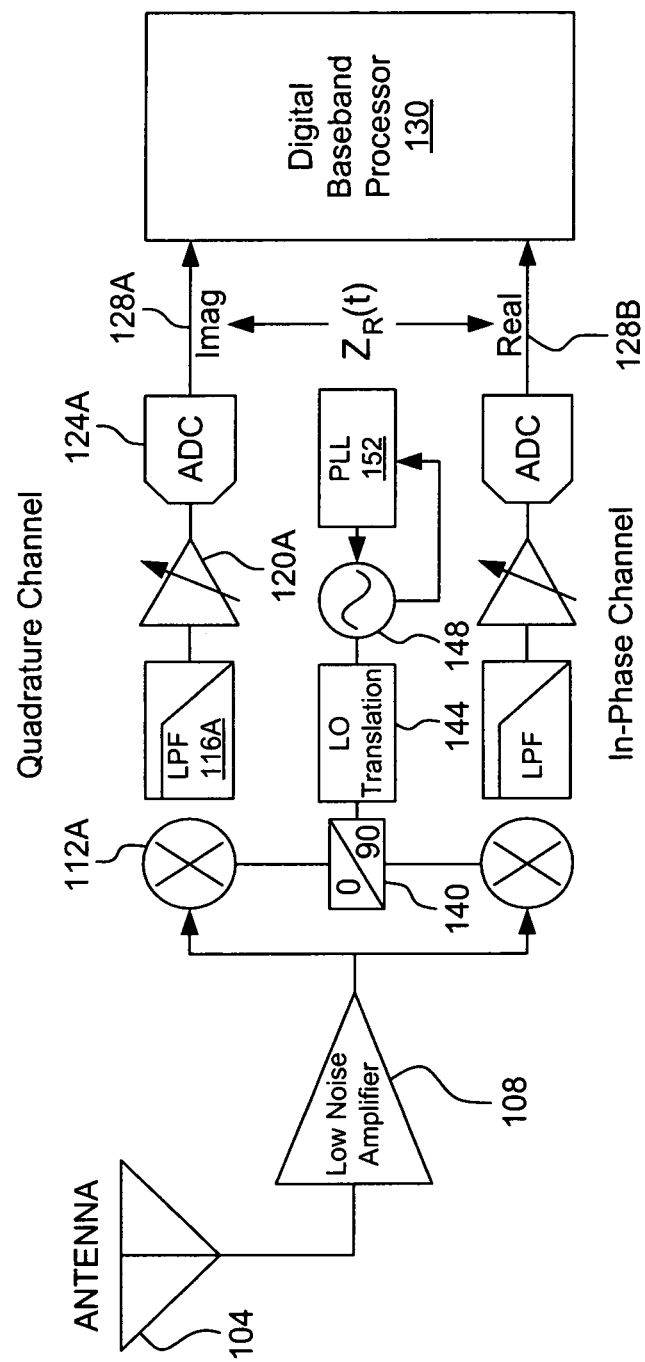
FIG. 1 illustrates a block diagram of an example embodiment of a direct conversion receiver.

FIG. 1 illustrates a block diagram of an example embodiment of a direct conversion receiver. FIG. 1 is but on possible embodiment of a direct conversion receiver and certain components are omitted to aid in understanding. One or more antenna 104 is provided to capture electromagnetic energy signal and convert such energy to a low power electrical signal. The antenna 104 has an output which connects to a low noise amplifier (LNA) 108. The LNA amplifies the received low power signal to a larger magnitude without introducing unwanted noise or distortion. The output of the amplifier 108 connects to a first mixer 112A and a second mixer 112B. To reduce duplication in this discussion, only the top signal path is discussed in detail. The bottom signal path is generally identical to the top signal path but operates on the real signal components.

The mixer 112A receives an input signal from a splitter 140, which splits a signal from a local oscillator translator 144 into offset signal which are at zero degrees and ninety degrees offset. The local oscillator translator 144 performs frequency modification as is understood in the art, in this example embodiment, up conversion. An oscillator 148 provides the input to the local oscillator translator 144. The oscillator 148 operates in connection with a phase lock loop 152 using a feedback path, as is known in the art, to generate the desired mixer signal.

After mixing directly to baseband, the output of the mixer 112A provides a baseband signal to a low pass filter 116A. The low pass filter 116A is configured to filter out unwanted high frequency components and noise. The filtered signal is next processed by a variable amplifier 120A configured to set the magnitude of the signal to an appropriate level for an analog to digital converter (ADC) 124A. As is understood, the ADC 124A converts the analog baseband signal to a digital format, which is in turn output as an imaginary signal component on an imaginary signal path 128A to a digital baseband processor 130. As shown, the processor 130 performs digital signal processing on the signal in the digital domain.

The processor 130 may comprise any type processing device configured to perform processing on a baseband signal in accordance with the wireless processing disclosed herein. In addition, the baseband processor 130 performs additional processing to overcome the drawbacks of the prior art. The processor 130 may comprise a DSP or a general processor, an application specific processor (ASIC) using custom synthesized Register Transfer Logic, or a Field Programmable Gate Array. The processor 130 may be configured to execute machine readable code which may be stored as part of the processor or on an associated memory (not shown).

Figure 2:
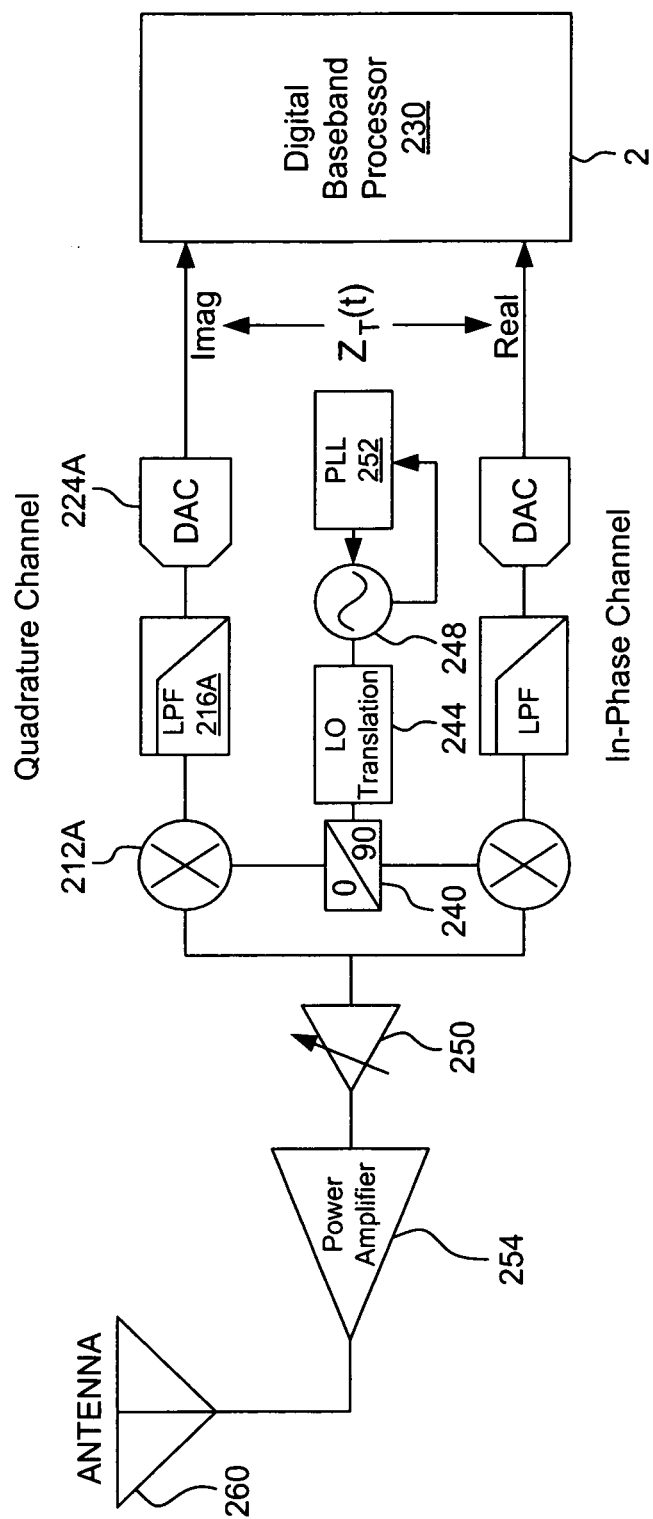
FIG. 2 illustrates a block diagram of an example embodiment of a direct conversion transmitter

FIG. 2 illustrates a block diagram of an example embodiment of a direct conversion transmitter. The transmitter of FIG. 2 operates on the same basic principles as the receiver shown in FIG. 1, but the focus is to perform processing on the digital signal to overcome imbalance and then convert the digital signal to a analog signal for eventual transmission over a wireless channel.

In this embodiment, the digital baseband processor 230 performs processing as is described herein to mitigate signal imbalance and other anomalies. The output of the digital baseband processor 230 provides an imaginary signal component to a digital to analog converter (DAC) 224A. As with the embodiment of FIG. 1, only the top imaginary signal path is discussed as it is understood that the lower signal real signal path is generally similar to the upper imaginary signal path.

The DAC 224A converts the received digital signal to an analog format, which is in turn output to a low pass filter 216A. The low pass filter 216A removes unwanted high frequency noise and signal components before the signal is input to a mixer 212A. The mixer up converts the baseband signal directly to the carrier frequency. The resulting high frequency signal is provides to a variable amplifier 250 and then to a power amplifier 254. Both amplifiers 250, 254 amplify the signal to a level suitable for transmission over an antenna 260. The embodiments of FIG. 1 and FIG. 2 may share a common antenna. A duplexer (not shown) or other hardware may be provided to separate incoming from outgoing signals.

The other aspects of the mixer 212A include the splitter 240, which splits a signal from a local oscillator translator 244 into an offset signals which are offset by ninety degrees. The local oscillator translator 244 performs frequency modification as is understood in the art, in this example embodiment, up conversion. An oscillator 248 provides its oscillator output to the local oscillator translator 244. The oscillator 248 operates in connection with a phase lock loop 252 using a feedback path, as is known in the art, to generate the desired mixer signal.

The Direct Conversion radio architecture, of FIG. 1 and FIG. 2, has the benefit of being simpler than super heterodyne and it lends itself well to monolithic integration. With careful planning and consideration, it is possible to build direct conversion transceivers that meet very demanding performance requirements. However, the issues inherently solved by the super heterodyne architecture must be handled in different ways. These single-chip transceivers direct conversion system are prevalent in markets such as Wireless LAN, WIMAX, and the various cellular standards (including 3G and 4G) due to their low cost and small form factors. The architecture of a radio receiver is based upon consideration that the desired signal (which ranges in magnitude from extremely small to extremely large) exists in the presence of adjacent and co-channel signals whose magnitudes could be significantly larger.

The direct conversion transceiver should operate over a broad range of frequencies but no suitable channel filter technology (in existence today) is capable of being tuned in the same fashion. Therefore, the down conversion mixers (whose linearity is directly coupled to current consumption), are exposed to a wide dynamic range of received signals at various offsets from the desired carrier. Should the cumulative waveform, comprised of its various spectral components, drive these mixers beyond their linear operating range, the desired signal is irrecoverably lost. Low-power direct conversion receivers utilize only the minimum amount of radio frequency (RF) gain required to overcome the noise and loss of the mixers and the remainder of the system gain is produced after this frequency conversion. Once the RF signal is linearly translated to its quasi-synchronous complex baseband components, fixed low pass filters serve as the RF channel filter. This channel filter is comprised of a complex pair of high-order low pass filters that act separately upon the real and imaginary paths. At this point, the off channel spectral energy is removed, the desired signal is amplified by a factor of up to 70 dB or more by variable gain, by limited dynamic range amplifiers. The gain of each these independent amplifiers is set so that the resultant output waveforms match the even more limited dynamic range of the analog to digital converters (ADCs).

I/Q Imbalance Impairments

There exist two major impairments to the accuracy of the transmitted/received waveform amplitude imbalance and quadrature phase error. The amplitude imbalance results from the fact that real and imaginary paths exist as separate entities in the receiver/transmitter, but is exacerbated in the receiver by the degree and the control range of baseband variable gain amplifiers. Amplitude imbalance in a receiver is a function of gain, while usually more static in a transmitter.

Quadrature phase error results in a up/down conversion error where the real and imaginary components of the transmitted baseband-equivalent or received baseband signal become somewhat correlated. Ideally, the (LO) sinusoids that is associated with the 'quadrature' mixer (the imaginary path) has a phase relationship of −90 degrees as compared to the 'in-phase' mixer. However, any deviation from the −90 degree phase relationship these two paths represents quadrature phase error. Quadrature up/down conversion, while also commonly utilized in super heterodyne radio architectures, is more problematic in Direct Conversion since this phase separation must be maintained over a broad range of RF channels rather than a single intermediate frequency that the much lower than that of the carrier.

The result of I/Q imbalance (amplitude and phase) is that, relative to the receivers (or transmitters) own LO phase and frequency, the baseband (or baseband equivalent) waveform exists in the presence of a phase-rotated version of its own complex conjugate. It is observed that the spectra of the baseband waveform exists in the presence of its own spectral mirror-image, when this type of distortion is present.

Additional Direct Conversion LO and DC Offset Considerations

One of the most significant challenges in the implementation of single-chip direct conversion transceiver is the fact that such technology offers only a finite amount of component-to-component (i.e., transistors, inductors, resistors, capacitors, etc.) isolation and matching. This means that the three ports of a mixer (input, LO, and output) are directly coupled to some degree.

Furthermore, the signals produced by the LO, comprised of a tunable Voltage Controlled Oscillator (VCO) are present on all ports of the mixer, as well. Finally, there exists coupling between the antenna and the VCO. The results of the coupling effects can be catastrophic when ignored. In a receiver, the presence of the LO signal at multiple to ports of the mixer (this is equivalent to mathematical squaring), limited port-to-port isolation, and device mismatch result in a continuous DC component at the mixer's output. VCO and LO leakage through the antenna results and DC offsets that are a function of low noise amplifier (LNA) gain and antenna loading.

These DC offsets are dynamic, hence difficult to anticipate. Any such DC offset, whether dynamic or static can easily overload the subsequent variable gain amplifier (VGA) and ADC stages such that no useful information is present in the digital domain. Receiver static DC offsets are commonly removed by introducing some form of high-pass response to the output of the mixers. One technique utilizes a function that moves the s-plane zeros in a specific time sequence in order to rapidly remove the DC error, then hold that DC value without interfering with the signaling spectra. Another technique utilizes DAC-based DC nulling signal at the input of the VGAs. Receiver Dynamic DC offsets, however are very problematic since they are not predictable and can occur during time intervals where offset cancellation circuitry would interfere with the detectability of the signal. The best strategy regarding dynamic DC errors is to minimize their occurrence though use of careful LO architectures, layout and differential signaling help to reduce direct VCO coupling. The use of a VCO frequency that bears a non-integer relationship with the LO signal is a critical architectural choice that minimizes such dynamic coupling problems.

Transmitter baseband DC offsets tend to be static, and result in LO feed through (carrier leakage). These errors can be nulled by offsetting the I-Channel and Q-Channel DAC's such that minimum transmitter energy is detected at the power amplifier when no modulation information is presented.

The transceiver modulation phase stability is another key issue in direct conversion design. LO frequency translation (i.e., a 3/2 of 3/4 divide ratio) reduces phase disturbances since the very sensitive VCO is less coupled to the stages of the transceiver that exhibit load changes as they are adjusted. As a VCO is a quasi-linear circuit that contains positive feedback at a specific frequency, it is tremendously sensitive to any energy that bears an integer frequency relationship (especially energy that is a multiple of the VCO frequency). In the transmitter, such a frequency translation is even more crucial, as the modulated signal components will cause an unstable signal phase due this undesirable feedback.

Orthogonal Frequency Domain Multiplexing (OFDM)

Figure 3:
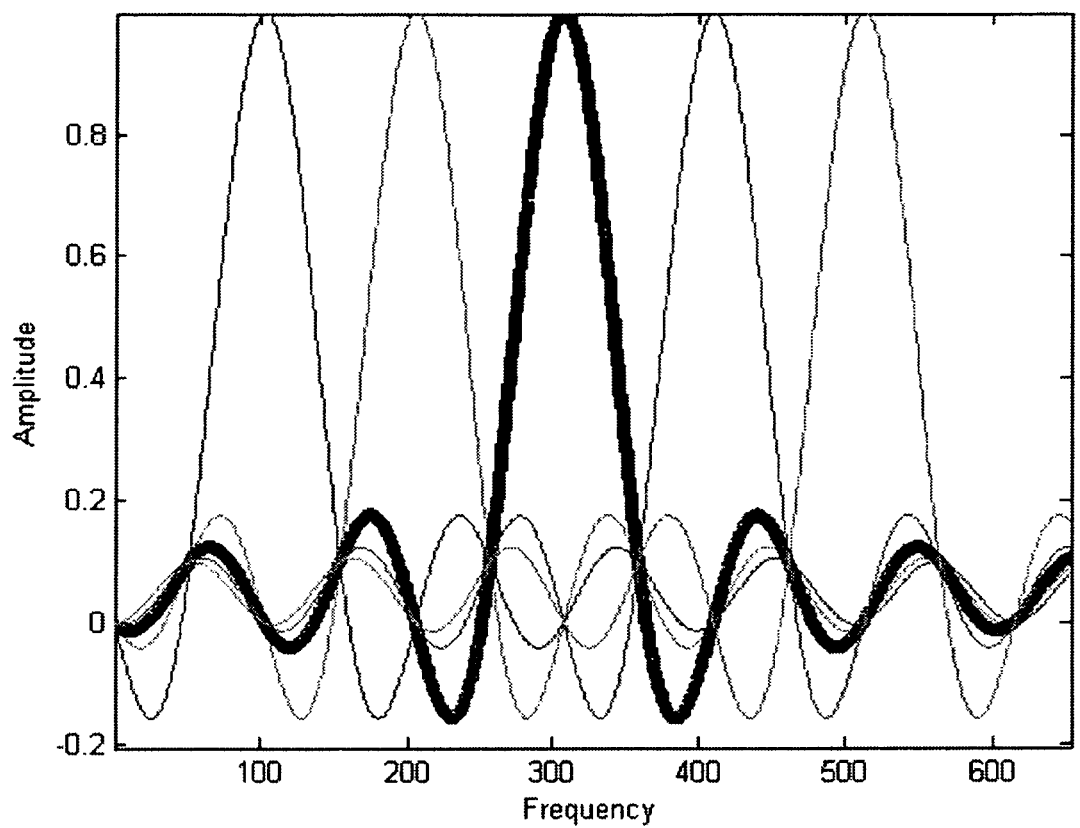
FIG. 3 depicts an example plot of the orthogonal relationship between subcarriers.

OFDM is a technique that divides the utilized spectra in many orthogonal carriers and each carrier is modulated independently. The orthogonality arises from the fact that the symbol period is inversely equal to the carrier spacing the nulls of each carrier (sin(x)/x spectra) are precisely aligned with the peaks of all neighboring carriers. FIG. 3 depicts an example plot of the orthogonal relationship between subcarriers. All symbols are transmitted concurrently, each with a bandwidth that is a fraction of the total utilized bandwidth. In one embodiment, each subchannel is much smaller than the coherence bandwidth of the multipath channel.

Each OFDM symbol, which contains the output of an inverse fast Fourier transform (IFFT) function that is preceded by a Guard Interval (whose purpose is to prevent intersymbol interference). The most common technique is the Cyclic Prefix (CP), which means that the symbol is prepended with its own time domain extension. The symbol, itself, contains individually modulated carrier tones that represent data symbols and pilot tones (for synchronization). Some frequency-domain bins, particularly those centered about DC and near the edges of the positive and negative spectrum, are left empty.

Performance Impact of I/Q Imbalance

Figure 4:
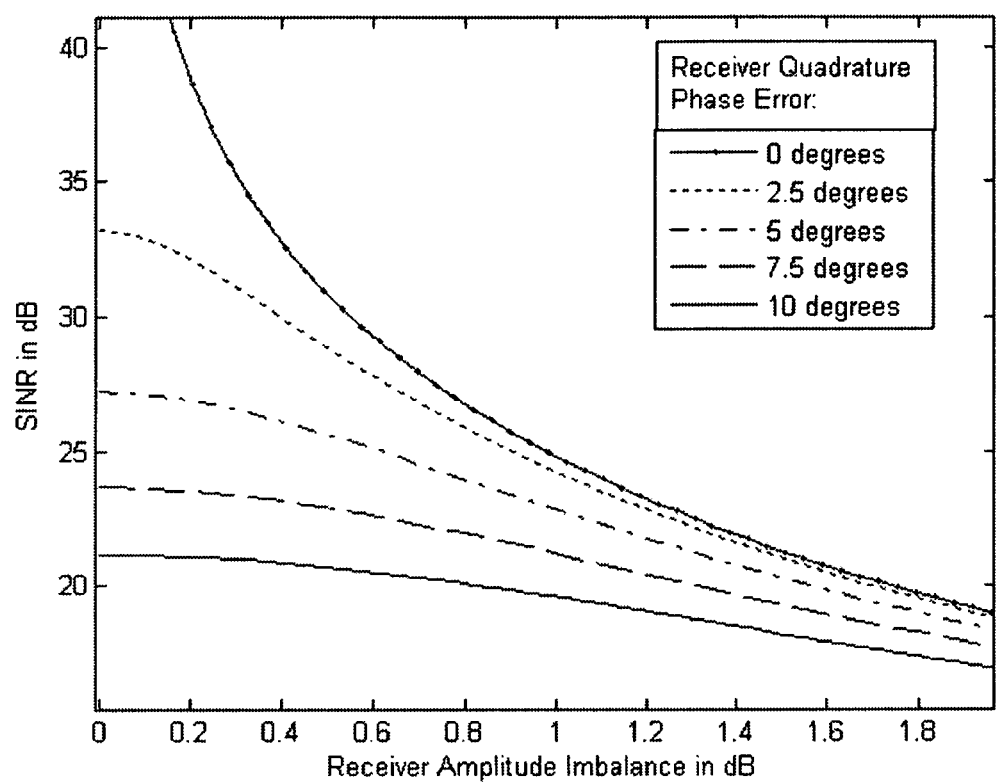
FIG. 4 illustrates the exact relationship between I/Q Imbalance and SINR.

I/Q imbalance comprises the combination of I/Q channel amplitude imbalance and LO phase error (the difference from 90-degrees between and I and Q LO signals). In a transmitter, the baseband equivalent of the modulated carrier exists in the presence of its own phase-shifted complex conjugate. In the time domain, a receiver that suffers from I/Q imbalance down converts the complex conjugate of the modulated carrier as well as the desired waveform to baseband. In the frequency domain, this interference term (the complex conjugate of the desired waveform) is the phase-shifted, complex conjugate, and mirror-image of the intended spectra. The result of this conjugate error is a degradation in SINR. FIG. 4 shows the exact relationship between I/Q Imbalance and SINR. In this embodiment, the receiver I/Q imbalance produces an interference component that is represented by a degradation in SINR. In the figure the SINR (in the absence of noise) is plotted versus amplitude imbalance, at various levels of I/Q Imbalance phase error. An identical result would occur for transmitter error, while the combination of both transmitter and receiver error would result in further degradation of SINR. Such non-linear distortion, unlike most other types of distortion and interference, can be corrected, once properly characterized.

These analytical expression for I/Q imbalance in a direct conversion transmitter is derived from the basic expression for a complex modulator, $$S_{T_{ideal}}(t) = \text{Re}\{z(t)e^{j\omega_T t}\}$$
$$= \text{Re}\{z(t)[\cos(\omega_T t) + j \cdot \sin(\omega_T t)]\}.$$
$$\text{Re}\{\xi\} = \frac{1}{2}[\xi + \xi^*],$$
$$S_{T_{ideal}}(t) = \text{Re}\{z(t)\}\cos(\omega_T t) - \text{Im}\{z(t)\}\sin(\omega_T t),$$

This directly describes the physical realization of the direct conversion transmitter. Considering an amplitude imbalance of $a_T$, having a value that is the difference in gain between the I and Q channels, and an I/Q Imbalance phase error of $\theta_T$. This is the difference from 90 degrees between the real and imaginary LO signals and as such, this expression becomes $$S_T(t) = \text{Re}\{z(t)\} \cdot \cos(w_T t) - \text{Im}\{z(t)\}(1+a_T) \cdot \sin(w_T t + \theta_T).$$

It can be shown that the transmitted baseband waveform is received in the presence of three interference products.

$$\widehat{z(t)} = \begin{array}{l} \frac{z(t)}{4}(1 + (1+a_R)e^{-j\theta_R})(1 + (1+a_T)e^{j\theta_T}) \\ \frac{z^*(t)}{4}(1 + (1+a_R)e^{-j\theta_R})(1 - (1+a_T)e^{j\theta_T}) \\ \frac{z^*(t)}{4}(1 - (1+a_R)e^{j\theta_R})(1 + (1+a_T)e^{-j\theta_T})e^{-2j(\omega_T - \omega_R)t - 2j\phi_T} \\ \frac{z^*(t)}{4}(1 - (1+a_R)e^{j\theta_R})(1 - (1+a_T)e^{-j\theta_T})e^{-2j(\omega_T - \omega_R)t - 2j\phi_T}. \end{array}$$

The received signal comprises the desired waveform, which is denoted by the first equation listed above. The next two equations represent the two scaled versions of the complex conjugate of z(t), where the third term is rotating at a frequency and phase twice that of the difference between the transmitter and receiver phase/frequency. The fourth term, corresponding to the fourth equation above, is a very weak, but asynchronous non-conjugate term. SINR is defined as the ratio of signal level to noise and interference products and for the above set for four equations the SINR is designated as:

$$SINR = 10\log_{10}\left[\frac{|k_1|^2}{|k_2|^2 + |k_3|^2 + |k_4|^2}\right]$$

Figure 5:
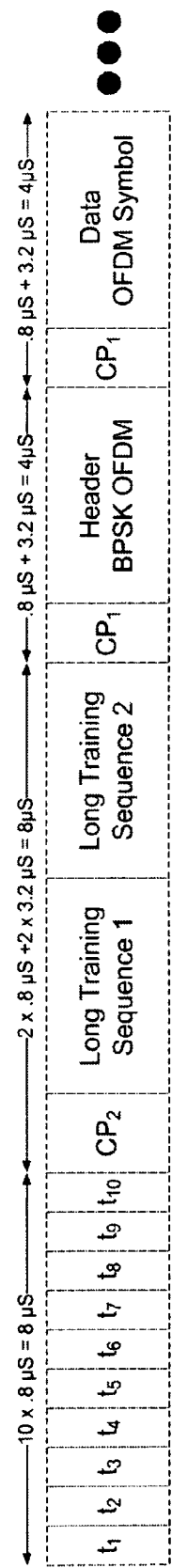
FIG. 5 depicts a preamble structure for an OFDM transmission (802.11a used as an example).

A generalized OFDM transmission, which is a train of individual time-domain symbols, starts with synchronization sequences. 802.11a OFDM transmissions, for example, begin with ten repetitions of a Short Training Sequence (STS), then two repetitions of the Long Training Sequence (LTS). FIG. 5 depicts this preamble structure. The STS is one quarter the length of a regular symbol while the LTS is the same length as the IFFT size. Following the LTS is the header symbol (which contains information about the subsequent modulation and coding rate) then a series of regular data symbols. Preceding the LTS symbols is a cyclic prefix that is half the length of the LTS, itself. The CP that precedes each data symbol is one quarter the length each such symbol.

802.11 MAC Considerations

The fundamental MAC (Medium Access Control) utilized by the 802.11 standard is Carrier Sense Multiple Access with Collision Avoidance (CSMA/CA). This means that each station listens to the channel to determine if it is in use before transmitting and randomizes the amount of delay before attempting to seize a newly relinquished channel. The random delay interval is set according to an algorithm that intends to less aggressively acquire the channel when traffic intensity is high. This scheme suffers from the limitation that not all stations are able to detect energy from all other stations (hidden nodes) and collisions are still common.

In one embodiment, there are two fundamental modes of operation at the network level, namely ad hoc and access point mode. The ad hoc mode is a multi-user scenario where stations connect directly to other stations and communicate as peers. Access point mode means that individuals nodes may only communicate with an access point (the access point usually acts as a gateway to a wired network), even when data is intended for a peer that is also operating on the same subnetwork. While the 802.11 standard specifies timing and network coordination protocols in great detail, such channel use procedures are not coordinated with stations operating on other networks. As a result, the 802.11 channel is shared among many users and possibly many unrelated networks of users. For example, one particular station is likely to receive packets in which it is not the intended recipient. In general, a WLAN node is required to decode at least the beginning of every packet it receives in order to determine whether to discard the packet or pass the information to higher layers of the network protocol stack.

System Model

Figure 6:
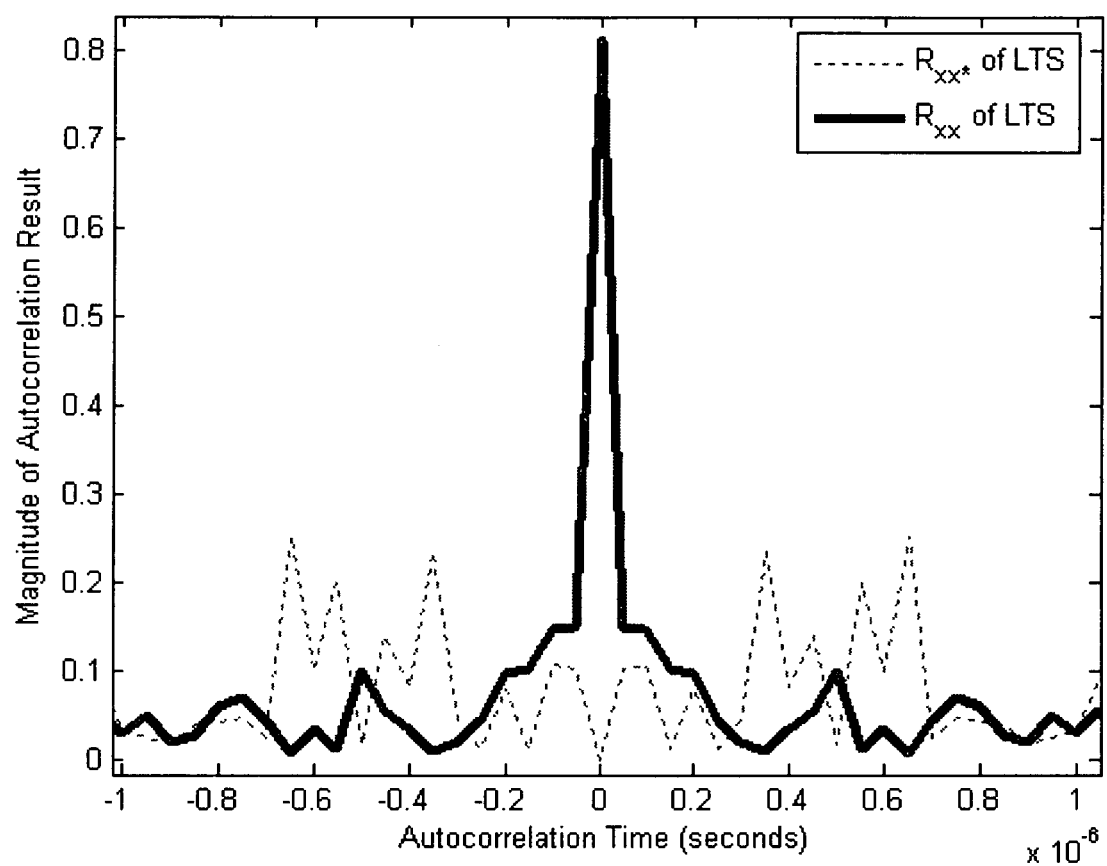
FIG. 6 shows plots of these correlation results at a range of time offsets.

The complex envelope of the undistorted transmitted signal z(t) is related to the complex envelope of the transmitter output $z_T(t)$, then to the complex envelope of the noiseless signal at the input to the receiver $z_C(t)$, and finally to the noiseless complex baseband received signal after down-converting $z_R(t)$. While these relationships hold for arbitrary z(t), we are especially interested in z(t) being a known, training sequence (e.g. the Long Training Sequence (LTS) in the IEEE802.11a standard) so that the relevant parameters of I/Q imbalance, phase/frequency error, and dispersive multipath can be estimated at the receiver. The LTS has a thumbtack-shaped autocorrelation function and a low correlation with its complex conjugate for all delays (I/Q imbalance distortion components are primarily the complex conjugate of the desired signal components). This type of waveform facilitates the estimation of I/Q imbalance parameters as is disclosed herein. FIG. 6 shows plots of these correlation results at a range of time offsets. Without loss of generality, the phase of the receiver's in-phase branch is set to zero, and define the complex envelope c(t) of a passband signal x(t) with respect to the receiver's in-phase branch, defined as:

$$x(t) = \text{Re}(c(t)e^{jw_R t})$$

Here, $w_R$ is the radian carrier frequency of the receiver. The noiseless transmitter output s(t) may be related to z(t) as:

$$s(t) = \text{Re}\{z(t)\}\cos(\omega_T t + \phi_T) - \text{Im}\{z(t)\}(1 + a_T)\sin(\omega_T t + \theta_T + \phi_T),$$
$$= \text{Re}\{z_T(t)e^{j\omega_R t}\}, \text{ where}$$
$$z_T(t) = \frac{1}{2}r(t)(1 + (1+a_T)e^{j\theta_T})z(t) +$$
$$\frac{1}{2}r(t)(1 - (1+a_T)e^{j\theta_T})z^*(t), \text{ and}$$
$$r(t) = e^{j(\omega_T - \omega_R)t + j\phi_T}.$$

Here $a_T$ ($\theta_T$) denotes the relative amplitude (resp. phase) imbalance of the transmitter's quadrature branch, and $\omega_T$ is the radian carrier frequency of the transmitter. Also, $\phi_T$ is the phase offset between the in-phase branches of the transmitter and receiver, and the function r(t) accounts for the instantaneous phase offsets between these branches.

As a result of the effects of I/Q imbalance at both transmitter and receiver, phase offset, frequency offset, and channel distortion, we have the following relationship between the received noisy baseband signal ž(t) and its ideal counterpart z(t), and its ideal counterpart z(t), $$ž(t)=r(t)(k_1 h \star z(t)+k_2 h \star z^*(t))+r^*(t)k_3 h^* \star z^*(t)+n(t),$$
$$0 \leq t \leq N-1,$$

where n(t) denotes zero-mean, complex-circular wide-sense stationary white noise. In the special case when transmitter imbalance may be ignored, $k_2=0$. With the additional restriction of perfect oscillator synchronization, it can be shown that:

$$r(t)=1, \text{ and } ž(t)=k_1 h \star z(t)+k_3 h^* \star z^*(t)+n(t)$$

In the absence of channel distortion, oscillator offset, and I/Q imbalance at both transmitter and receiver, ž(t)=z(t)+n(t), as expected. Finally, in the absence of channel distortion, oscillator offset, and I/Q imbalance at both the transmitter and the receiver is:

$$ž(t)=z(t)+n(t)$$

It is contemplated that the covariance matrix may be expressed as:

$$cov\begin{pmatrix} \text{Re}\tilde{w}(t) \\ \text{Im}\tilde{w}(t) \end{pmatrix} = \sigma^2 \begin{bmatrix} 1 & (1+a_R)\sin\theta_R \\ (1+a_R)\sin\theta_R & (1+a_R)^2 \end{bmatrix}.$$

Clearly, the noise distribution depends on the receiver imbalance parameters. To facilitate the estimation of the parameters, it would be desirable to approximate this covariance matrix by one which is invariant to the unknown parameters. For typical values of receiver imbalance (0:9 dB=4°) then $a_R$=0:11, and the covariance matrix set forth above becomes $$cov\begin{pmatrix} \text{Re}\tilde{w}(t) \\ \text{Im}\tilde{w}(t) \end{pmatrix} = \sigma^2 \begin{bmatrix} .5 & 0.04 \\ 0.04 & .61 \end{bmatrix},$$

Using a tap-delay line model for the channel, analysis occurs to find a matrix representation which will be useful. Assuming that there are L+1 channel taps $h_0, \ldots h_L$, where $h_L$ is the complex envelope of the impulse response at sample lag 1.

Next, setting $$\tilde{z}=[ž(0), \ldots ž(N+L-1)]^T$$

denote the vector of received baseband samples, $\xi_1$ denote the 1×1 zero vector, and Using this notation, it is possible to describe ž as $$\tilde{z}=RAp+R^*Bq+n,$$

where $R=\text{diag}(r(0), \ldots r(N+L-1))$, $A=[z_0, z^*_0, z_1, z^*_1, \ldots z_L, z^*_L]$, $B=[z^*_0, z^*_1, \ldots z^*_L]$, $p=[h_0 k_1, h_0 k_2, \ldots h_L k_1, h_L k_2]^T$, $q=[h^*_0 k_3, \ldots, h^*_L k_3]^T$, and $n=[n(0), \ldots n(N+L-1)]^T$.

Phase/Frequency Offset Estimation

After sampling and quantization, the phase and frequency offsets may be estimated and corrected within the digital domain of the receiver. The synchronization factor r(t) is estimated by cross correlation between the received waveform and known deterministic sequences. In the particular case of IEEE 802.11a, for example, ten replicas of the Short Training Sequence (STS) are transmitted, and the cross correlation outputs are used for coarse, unwrapped, frequency offset acquisition. Additionally, two copies of the Long Training Sequence (LTS) are transmitted, and the cross correlations allow improvements in frequency and phase estimates. In either case, the correlation output for the $i_{th}$ transmitted replica of z(t) at sample time $t_i$ may be described by:

$$\tilde{R}_i=r(t_i)(k_1 h \star R_{zz}(t_0)+k_2 h \star R_{zz^*}(t_0))+r^*(t_i)k_3 h^* \star R_{zz^*}(t_0)+v(t_i), i=0, \ldots T-1.$$

As a result, $R_{xy}(t)$ denotes the cross correlation between the complex signals x(t) and y(t); and v(t) describes the colored noise at the correlator output. The cross correlations in the prior equation have a common time argument since the time between successive replicas is known at the receiver. The value r(t) produces a negligibly relevant phase rotation across the support of z(t). As such, the combined effect of the I/Q imbalance parameter $k_2$ and channel response h(t) is a translation of the circle of rotation of the sequence {$\tilde{R}_i$} in the complex plane, as seen from the first term of prior equation. This is an identical effect as with linear, time-invariant distortion in the absence of I/Q imbalance. Additionally, the effect of the imbalance parameter $k_3$ is the addition of a counter-rotating component. In this embodiment, a traditional estimator is used for phase and frequency offset which ignores channel distortion and I/Q imbalance. In particular, an estimate of the frequency offset $\omega_T-\omega_R$ and phase offset $\phi_T$ using the least squares approach is applied in this linear phase model.

Figure 7:
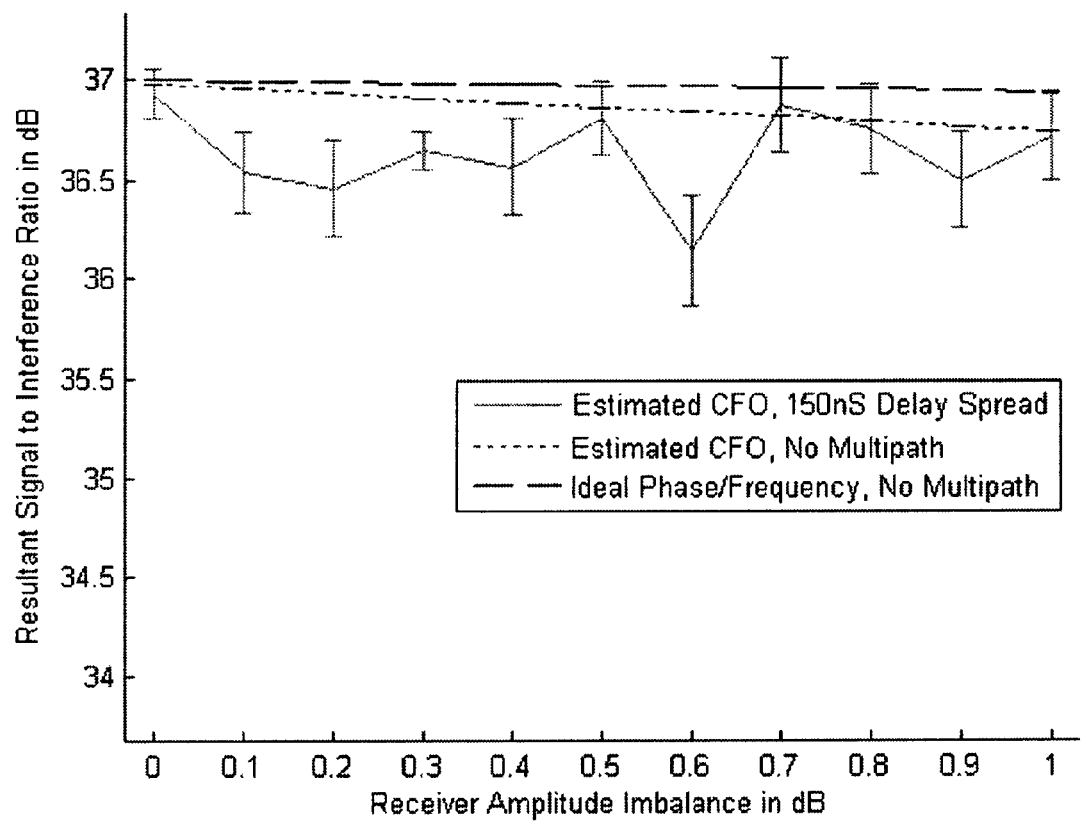
FIG. 7 illustrates the resultant signal to interference ratio (in the absence of noise) for the proposed method plotted as the RX amplitude imbalance is varied.

FIG. 7 illustrates the resultant signal to interference ratio (in the absence of noise) for the proposed method plotted as the receiver amplitude imbalance is varied. The frequency offset is 150 kHz, ten packets are simulated per amplitude imbalance value, and three scenarios are demonstrated: 1) basic estimation without multipath, 2) basic estimation with 150 ns of delay spread, and 3) ideal CFO estimation. It is demonstrated that I/Q imbalance has little effect of phase/frequency offset (CFO) estimation for the 802.11a scenario.

Next, the de-rotated received baseband vector is defined as:

$$\hat{z}=\tilde{R}^H \tilde{z} \approx R^H \tilde{z} = \mathcal{A} d+w,$$

where $\mathcal{A}=[A|(R^*)^2 B]$, $d^T=[p^T q^T]$, and $w=R^*n$.

In the absence of CFO estimation error, the noise vector has a distribution which does not depend on r(t) and it has small quadrature correlation due to receiver imbalance. For ease of exposition, we will neglect CFO estimation error and noise correlation. In the numerical simulations, however, both CFO estimation error and noise correlation are included in the performance analysis.

Figure 8:
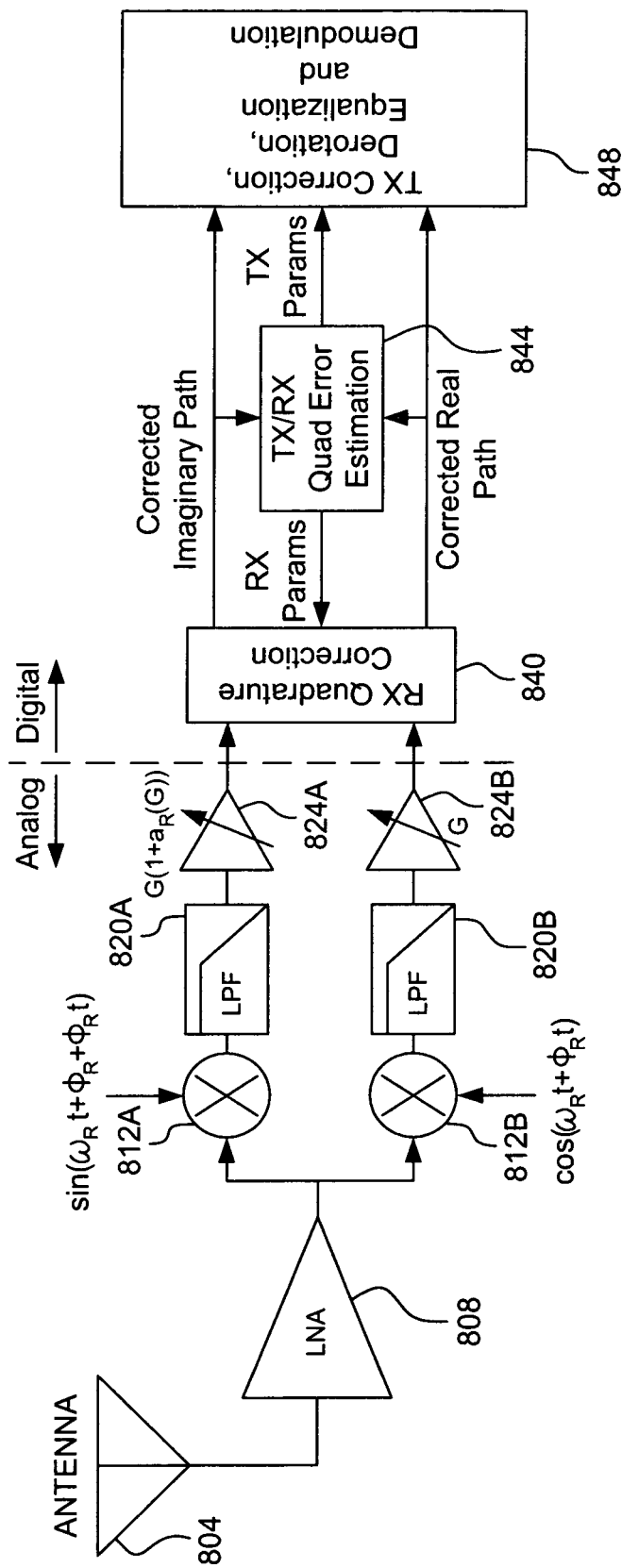
FIG. 8 illustrates a block diagram of a direct conversion receiver with imbalance correction system.

FIG. 8 illustrates a block diagram of a direct conversion receiver with imbalance correction system. The analog front end of FIG. 8 is generally similar to the analog front end of the system of FIG. 1. As such, these components are not described in detail to avoid repetition with the disclosure associated with FIG. 1. As shown, an antenna 804 receives a radio frequency signal and converts the received signal to a low power electrical signal. The output of the antenna 804 connects to a low noise amplifier (LNA) 808. The LNA 808 amplifies the received signal without introducing unwanted noise or distortion. The output of the LNA 808 feeds into duel mixers 812A, 812B as shown. The mixers 812A, 812B also receive oscillator signal as shown and operation as described above to output a baseband signal. The output of the mixers 812A, 812B feed into low pass filters 820A, 820B, which are configured to pass the low frequency signal components while rejecting the high frequency components. The output of the low pass filters 820A, 820B connect to variable amplifiers 824A, 824B, which adjust the magnitude of the signal to level appropriate for analog to digital conversion.

Once the signals are in the digital domain, the signals progress to a receiver quadrature correction module 840. The quadrature correction module 840 outputs a corrected imaginary signal on the uppers path as shown and a corrected real signal on the lower path as shown. The corrected imaginary signal and the corrected real signal are provided to a transmitter correction, de-rotation, equalization and demodulation module 848.

The corrected imaginary signal and the corrected real signal are also provided to a quadrature error estimation module 844. In this embodiment the quadrature error estimation module 844 is shared between the transmitter and receiver systems. The quadrature error estimation module 844 provides estimates of receiver imbalance parameters to the receiver quadrature correction module 840 and estimates of both transmitter parameters and the channel impulse response to the transmitter correction, de-rotation, equalization and demodulation module 848. The elements 840, 844, 848 may be enabled in hardware, software, or a combination of both. The elements 840, 844, 848 may be configured in a single semiconductor element, multiple or separate elements, or combination thereof. In one embodiment the elements 840, 844, 848 are enabled on an ASIC, FPGA, or DSP element.

In operation, the digital portion of the system of FIG. 8 operates as follows. The receiver quadrature correction module 840 receives the imaginary and real signals and upon these signals performs receiver imbalance compensation. This correction divides the output of 824A by the estimate of $(1+a_R(G))$ and rotates this signal by an estimate of $\theta_R$ thereby reducing the receiver imbalance. The term G is or relates to gain. These estimates are provided by module 844 to module 840. As compared to the received signal, the signals output by the receiver quadrature correction module 840 exhibit reduced receiver imbalance, provided that the receiver imbalance estimates provided by module 844 are accurate.

After processing by the receiver quadrature correction module 840, the corrected signals are output to the transmitter correction, de-rotation, equalization and demodulation module 848. The module 848 performs equalization, derotation, and transmitter imbalance correction (in this order) on the signals. First, to remove or reduce the effects of channel distortion, the module 848 performs linear equalization in the usual manner, either in the time or frequency domain. This is accomplished by using the estimate of the channel impulse response provided to module 848 by module 844. Next, to remove or reduce the effects of CFO, the module 848 performs CFO correction by derotation. In this embodiment, the CFO compensation tracks the phase and frequency offset between transmitter and receiver, which may be done in module 848 in a conventional manner. The output of the CFO compensation are two signals, conventionally called the in-phase and the quadrature branches (not shown in FIG. 8). Relative to the in-phase branch, the quadrature branch exhibits an undesired factor $(1+a_T)$ and an undesired phase shift of $\theta_T$ due to transmitter imbalance.

To reduce or remove the effects of transmitter imbalance, module 848 divides the quadrature branch by an estimate of $(1+a_T)$ and shifts this signal by an estimate of $-\theta_T$. These transmitter imbalance estimates are provided by module 840 to module 848. Finally, demodulation of the signal is performed in the conventional manner.

The correction performed by the transmitter correction, de-rotation, equalization and demodulation module 848 provides the benefit of data detection which accounts for CFO, transmitter and receiver imbalance, and channel distortion.

To aid in the processing by the modules 840, 848, the quad error estimation module 844 processes both the corrected imaginary signal and the corrected real signal to generate the receiver parameters and the transmitter parameters as shown. The processing performed by the quad error estimation module 844 comprises the estimation of $a_T$, $a_R$, $q_T$, $q_R$, and $\{h_1\}$, and described below.

Output from the module 848 is the baseband corrected signal with further unwanted signal degradations corrected or removed. It is contemplated that further signal processing may occur before the resulting signal is provided to high layers in the computing device.

Estimation of $a_T$, $a_R$, $\theta_T$, $\theta_R$, and $\{h_1\}$

Figure 9:
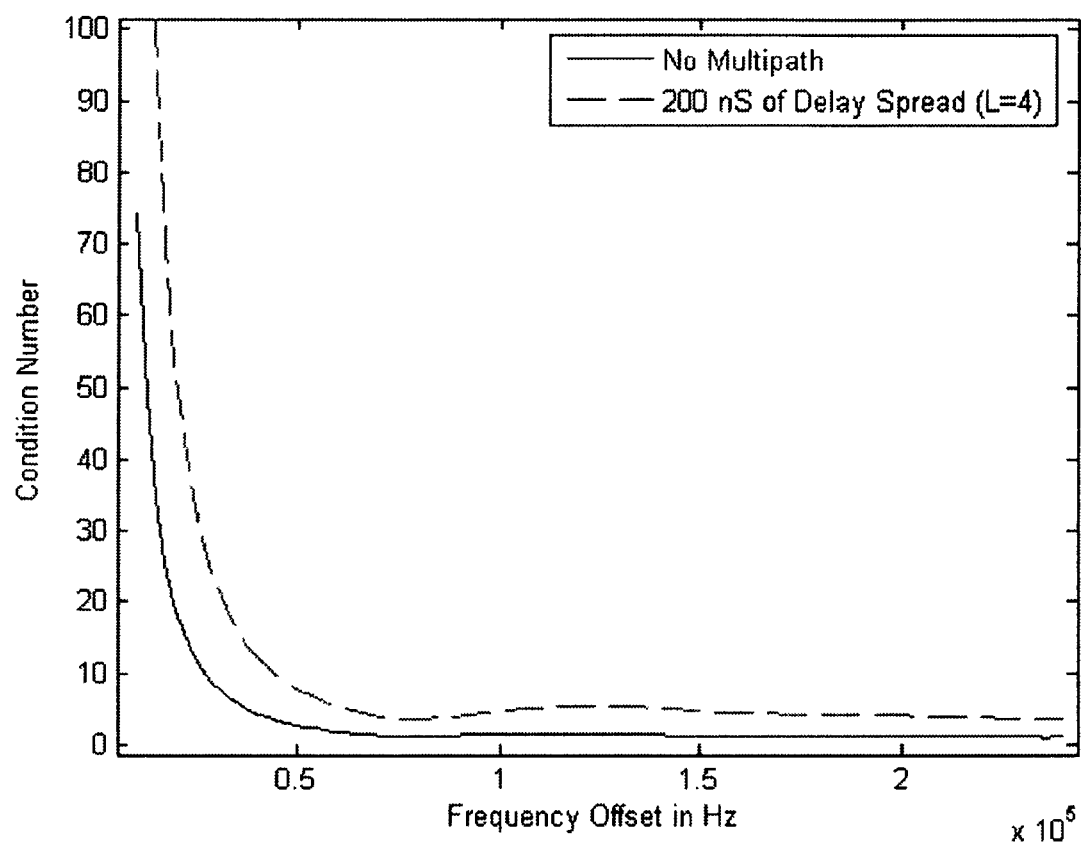
FIG. 9 illustrates of plot of frequency offset in Hz verses condition number.
Figure 10:
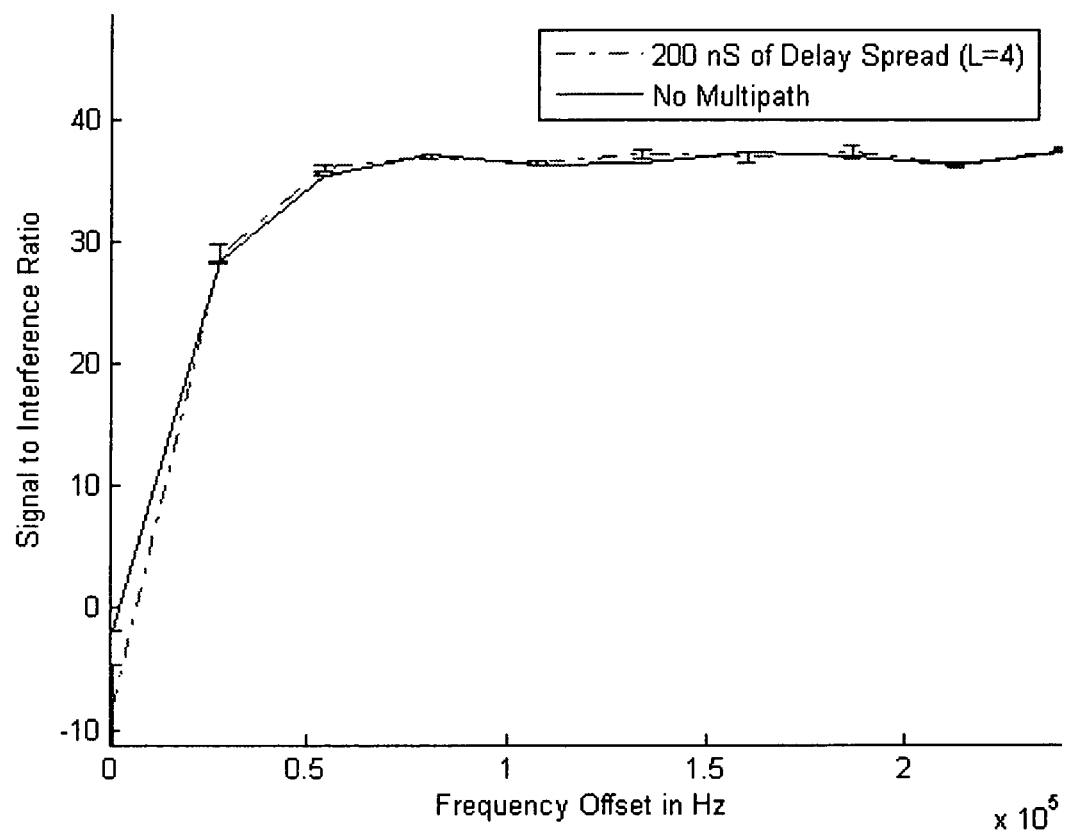
FIG. 10 illustrates a plot of signal to interference ration verses frequency offset in Hz.

Since the matrix A in the prior section consists of known (or estimated) column vectors, the estimation of $d^T=[p^T\ q^T]$ may be achieved by the method of unweighted linear least squares. As the frequency offset decreases in magnitude, however, the condition number of the Grammian $A^T A$ rise. This is shown in FIG. 9, which illustrates of plot of frequency offset in Hz verses condition number. The resultant effect on the noiseless SINR is depicted in FIG. 10 and shown that the SINR degradation due to poor conditioning when plotted verses frequency offset in the presence of I/Q imbalance. This is a low-rank case mentioned above. For example, when z(t) corresponds to the IEEE802.11a LTS with L=4, the condition number exceeds 75 when the phase rotation is less than 0:1° during the STS duration (frequency offset magnitude of 0:15 ppm at 5:8 GHz). When the frequency instabilities of transmitter and receiver are independent, uniform random variables in the interval [−40, +40] ppm, then this occurs with a probability not greater than 1%. The following presents the algorithm in the case when the condition number of the Grammian is sufficiently small. Then, the situation when the condition number is high is considered.

The estimators for $a_T$, $a_R$, $\theta_T$, and $\theta_R$ follow from the estimator $$\check{d}=[\check{p}^T \check{q}^T]^T$$

and two facts. The first fact, shown by the equation that follow is that the variable $c_T=k_2/k_1$ depends only on the transmitter imbalance parameters. Estimators for $\theta_T$, $a_T$ could follow directly from an estimate of cT; čT as:

$$\check{\theta}_T = \arg\left(\frac{1-\check{c}_T}{\check{c}_T+1}\right),$$

$$\check{a}_T = \left(\frac{1-\check{c}_T}{\check{c}_T+1}\right)e^{-j\check{\theta}_T} - 1.$$

The estimate $\check{c}_T$ follows from the components of p as:

$$\check{c}_T = \left[\frac{1}{S}\sum_{l=0}^{L}\widetilde{h_l k_2}(\widetilde{h_l k_1}^*)\right],$$

$$S = \sum_{l=0}^{L}|\widetilde{h_l k_1}|^2.$$

As shown in the prior equation, the estimate for $c_T$ is a weighted average of components of p. The second fact follows is that $c_R=k_3/k^*_1$ provides an expression only in the receiver imbalance parameters. Setting $$\tilde{c}_R = \left[\frac{1}{S}\sum_{l=0}^{L} \widetilde{h_l^* k_3} (\widetilde{t_l k_1})\right]$$

which is determined from the estimates of the vectors q and p, which in turn yields $$\tilde{\theta}_R = \arg\left(\frac{1-\tilde{c}_R}{\tilde{c}_R+1}\right),$$

$$\tilde{a}_R = \left(\frac{1-\tilde{c}_R}{\tilde{c}_R+1}\right)e^{-j\tilde{\theta}_R} - 1.$$

Estimation of the channel coefficients follows from the estimation of the IQ imbalance parameters and the product vector p. The channel coefficients may be estimated by $$\tilde{h}_l = \widetilde{h_l k_1}/\tilde{k}_1, l=0, 1, \ldots L.$$

In the case when the Grammian has a high condition number, in this embodiment existing estimates of the receiver imbalance parameters from previous OFDM frames at similar gain settings are used. The location of the receiver I/Q imbalance correction algorithm facilitates this technique where historical receiver correction results continue to be applied to the incoming waveform this is particularly helpful for both the low-rank situation and further reduces the contribution of CFO estimation error since the remainder of the algorithm is exposed to a waveform that is already corrected for receiver I/Q imbalance. These estimates may be used to correct the receiver-induced error, producing a new observation. In all subsequent calculations, it is proposed to set the equivalent receiver parameters $a_R$, $\theta_R$ to 1 and 0, respectively. As shown above, the parameter $k_3$ is set to zero, and the vector q is the zero vector. Accordingly, setting A=A and then estimate only the vector. In this case, A has full column rank, and the least squares solution for p is well defined. Estimation of the transmitter imbalance parameters and channel parameters proceeds as above.

Compensation Algorithm

The received signal, $z_R(t)$, is corrected in reverse order as the distortions occurred, as described in the following steps:

Receiver I/Q imbalance is corrected, and the phase/frequency offset is derotated:

$$z_{C\widetilde{(t_i)r^*}}(t_i) = \tilde{r}^*(t_i)(Re(\tilde{z}(t_i)) + Im(\tilde{z}(t_i))\tan(\tilde{\theta}_R) + jIm\{\tilde{z}(t_i)\})(\cos(\tilde{\theta}_R)\tilde{a}_R)^{-1}$$

The channel distortion is mitigated linearly in the frequency domain (symbol ·/ denotes component-wise division):

$$FFT(z_{T\widetilde{(t)r^*}}(t)) = FFT(\{z_{C\widetilde{(t_i)r^*}}(t_i)\}) \cdot / FFT([\tilde{h}_0 \ldots \tilde{h}_L 0_{N-L}]).$$

The derotated transmitter I/Q imbalance is corrected in the frequency domain:

$$FFT(\widetilde{z(t_i)}) = \sum_{r=1}^{N-1}\left((1+(1+\tilde{a}_T)e^{j\tilde{\theta}_T})\right)^{-1}\left[\widetilde{Z_{T0}}(b) - \left((1-(1+\tilde{a}_T)e^{j\tilde{\theta}_T})\tilde{Z}^*(L-b)\right)\right],$$

where $\widetilde{Z_{T0}}(b)$ represents the FFT of $z_{T\widetilde{(t)r^*}}(t)$ at spectral bin b.

Exemplary Results

In support of this disclosure, the following discussion provides results analysis based on model simulation. To accurately reflect this model, fully compliant 1000 byte 54 Mbps IEEE802.11a packets are generated and then passed through the transmitter, channel, and receiver models as described above. The compensation algorithms presented above are used on a demodulated waveform, where the corrected result is then compared to the ideal transmitted waveform. The Rayleigh channel model is implemented as an FIR whose complex coefficients are exponentially scaled complex Gaussian random variables. The I/Q Imbalance correction parameters are estimated and corrected separately for each packet based only on the linear least squares estimator of the two symbols of the 802.11a LTS (though the estimation accuracy would improve if memory were applied). It is important to note that in order to compare the proposed method and apparatus for correction fairly to algorithms unintended for packet-switched scenarios, the channel and transmitter parameters are static for all packets in the sequence.

Figure 11:
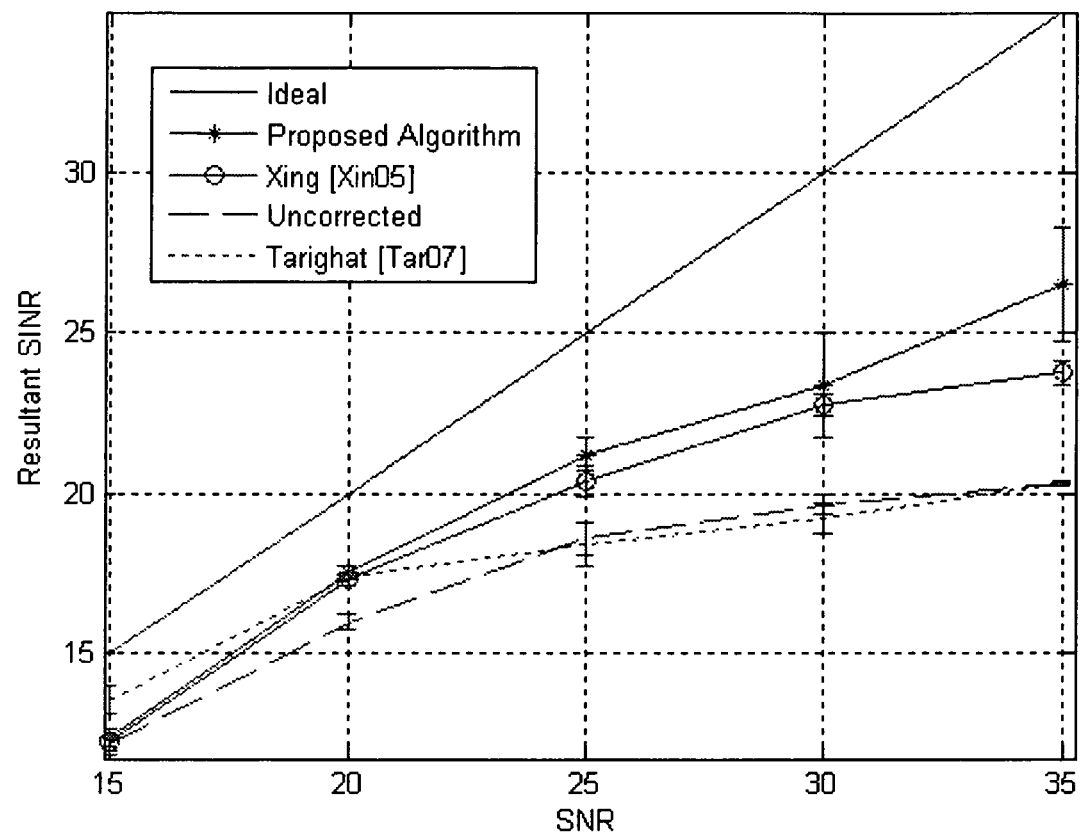
FIG. 11 compares the results of four different compensation approaches, namely two prior art approaches and the proposed algorithm, and no attempt at compensation where error bars at each data point span +−1 standard deviation of simulated realizations.

First the case of mild transmitter imbalance is presented. For these simulations, the delay spread was set to a typical value of 150 ns, and a moderate frequency offset of 15 ppm (90 KHz) was chosen as well as very mild transmitter impairments (0.1 dB for amplitude imbalance and −1° of phase imbalance). A moderate receiver imbalance (amplitude imbalance of 0.9 dB and a phase imbalance of 4°) was chosen, and the signal-to-noise ratio (SNR) is varied over a range of 15 dB to 35 dB. For comparison purposes, it is useful to note that a signal-to-noise-plus-interference ratio (SINR) of approximately 20 dB is required to achieve the 802.11a-specified packet error rate of 10%. Under ideal circumstances (no signal distortion of any kind), the SINR is equal to the SNR. FIG. 11 compares the results of four different approaches, namely two prior art approaches and the proposed algorithm, and no attempt at compensation. Error bars at each data point span +−1 standard deviation of simulated realizations. It is shown that that even very small transmitter I/Q imbalance (similar in magnitude to that of a hardware-calibrated transmitter) causes a significant SINR degradation. The interpretation of this result is that transmitter I/Q imbalance should not be ignored, even at very low levels.

Figure 12:
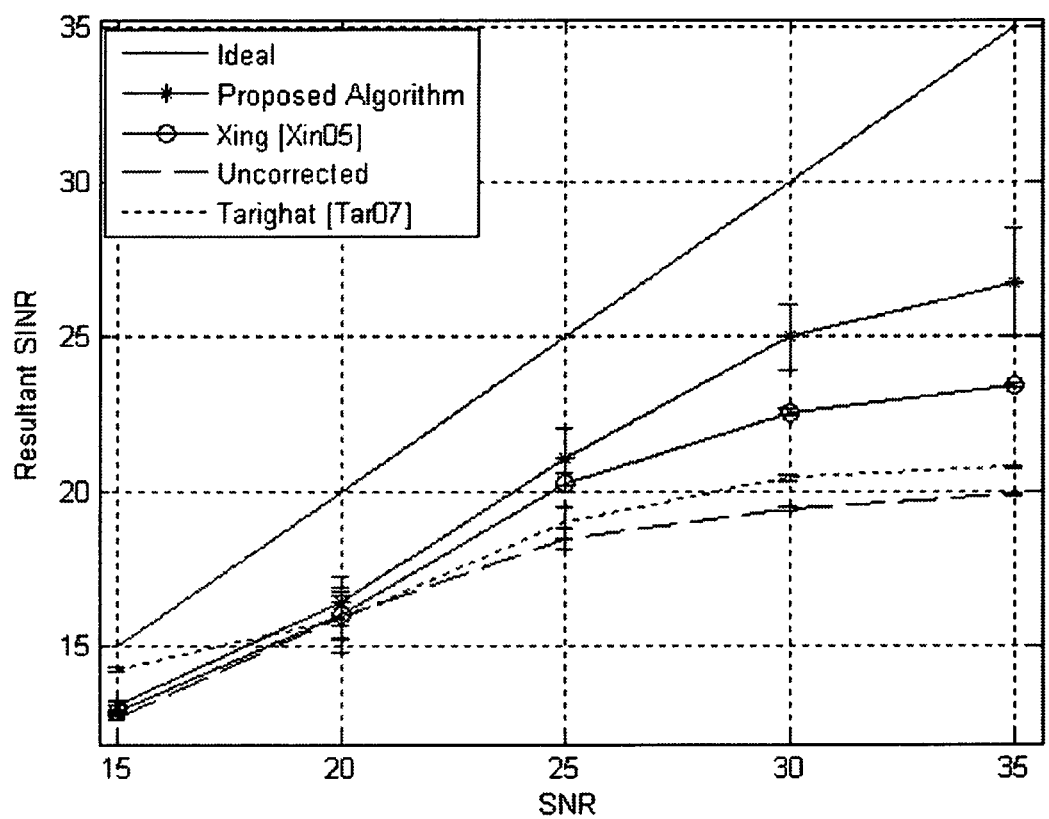
FIG. 12 shows a comparison of the ideal case with the same four approaches as in FIG. 6 with more severe transmitter impairment.

FIG. 12 shows a comparison of the ideal case with the same four approaches as in FIG. 6 with more severe transmitter impairment (0.4 dB/−5°). The other simulation parameters are unchanged. Again, the error bars span +−1 standard deviation of simulated realizations. This particular result demonstrates that even under severe circumstances, it is still possible to compensate for I/Q imbalance, channel distortion, and frequency offset. Here, at each SNR, there is approximately a 2.5 dB gap between the SINR of our algorithm and the ideal result. This constant error offset is attributed in part to the low complexity frequency-domain OFDM equalization technique.

Figure 13:
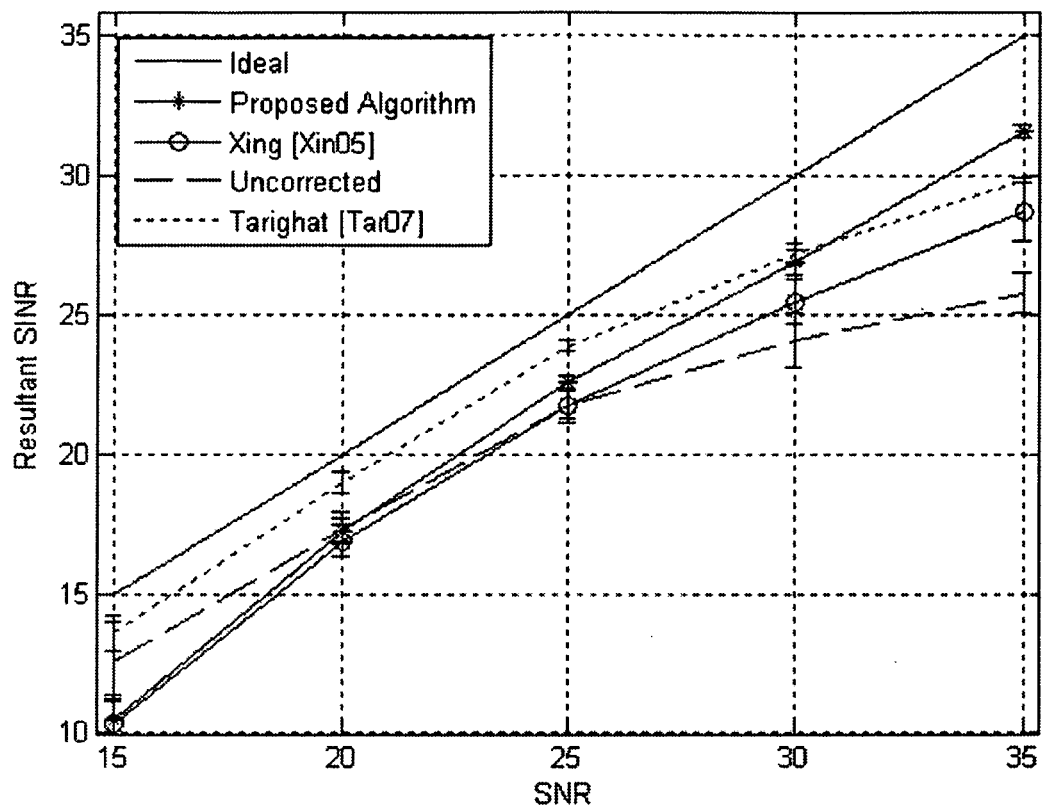
FIG. 13 then shows a comparison of the four approaches, under the same conditions as FIG. 7, but with zero frequency offset.

FIG. 13 then shows a comparison of the four approaches, under the same conditions as FIG. 7, but with zero frequency offset. This simulation assumes that, at some point in the past, a full rank packet has been received, and our algorithm defaults to the high condition-number approach, where the previously estimated receiver parameters are applied, the data matrix A is used, and only vector p is estimated. In the simulation, the previously estimated receiver parameters are uniformly selected within one standard deviation of the true parameters, where the standard deviation is chosen from FIG. 7. It is shown in FIG. 8 that the proposed algorithm is an effective for packet-switched direct-conversion transceivers in which each packet has been sent by the same transmitter. When successive packets come from different transmitters, the displayed performance of the proposed algorithm is preserved.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method for imbalance compensation in a direct conversion receiver system comprising:
   receiving a signal via an antenna at the receiver from a remote transmitter;
   amplifying the signal to create an amplified signal;
   providing the amplified signal to a mixer having a first input and a second input;
   within the mixer, converting the amplified signal to an imaginary baseband signal and a real baseband signal;
   converting the imaginary baseband signal and the real baseband signal to a digital format to create an imaginary signal and a real signal;
   processing the imaginary signal with a receiver quadrature correction module to restore quadrature amplitude and phase accuracy of the imaginary signal to create a receiver corrected waveform; and
   processing the receiver corrected waveform at the receiver to correct remote transmitter quadrature error introduced by the remote transmitter, the processing of the receiver corrected waveform including dividing one or more receiver imbalance corrected signals by a value, the value being a total of one plus an estimated transmitter amplitude imbalance value and then shifting phase by an estimate of unwanted phase shift.

2. The method of claim 1 further comprising processing the corrected imaginary signal and the corrected real signal with a quadrature error estimation module to generate one or more receiver parameters and one or more transmitter parameters, such that the one or more receiver parameters are used by the receiver quadrature correction module and the one or more transmitter parameters are used by the transmitter correction module.

3. The method of claim 1 wherein processing by the transmitter correction module further includes de-rotation for quadrature error.

4. The method of claim 1 wherein processing by the transmitter correction module further includes equalization for remote transmitter quadrature error.

5. The method of claim 1 wherein the signal received via an antenna is an 802.11 standard type wireless signal.

6. A method for correcting imbalance between real and imaginary signals in a direct conversion receiver comprising:
   receiving a real signal and an imaginary signal from a direct conversion receiver;
   performing quadrature correction, to correct error introduced by the receiver, on the real signal and the imaginary signal to create a corrected real signal and a corrected imaginary signal;
   performing quadrature error estimation with a quadrature estimation module to generate one or more receiver parameters and one or more transmitter parameters;
   receiving the corrected real signal and the corrected imaginary signal at a transmitter correction module, located at the receiver, and performing derotation and equalization on the corrected real signal and the corrected imaginary signal to correct error introduced by a transmitter, the performing derotation and equalization includes dividing the corrected real signal or corrected imaginary signal by a value, the value being a total of one plus an estimate of transmitter amplitude imbalance, and shifting a phase of the corrected real signal or the corrected imaginary signal by an estimate of the unwanted phase shift.

7. The method of claim 6 wherein the real signal and the imaginary signal are in a digital baseband format.

8. The method of claim 6 wherein performing derotation and equalization includes performing receiver quadrature correction in line before CFO estimation.

9. The method of claim 6 wherein the direct conversion receiver is a receiver operating in accordance with the 802.11 standard and the receiver suffers from imbalance.

10. A method, performed at a receiver, for correcting error in a direct conversion communication device comprising:
    receiving a one or more signals from a transmitter;
    performing receiver imbalance compensation including dividing the one or more signals by a value, the value being a total of one plus an amplitude error estimate, to create a result and then rotating the result by a receiver phase error estimate to create one or more quadrature corrected signals;
    performing linear equalization on the one or more quadrature corrected signals to reduce the effects of channel distortion to create one or more equalized signals;
    performing derotation on the one or more equalized signals to achieve carrier frequency offset compensation to create one or more transmitter imbalanced signals; and
    performing, at the receiver, transmitter imbalance compensation on the one or more transmitter imbalanced signals to reduce or remove transmitter imbalance introduced by the transmitter.

11. The method of claim 10 wherein performing transmitter imbalance compensation comprises dividing at least one of the one or more transmitter imbalanced signals by a total, the total being one plus a transmitter amplitude error estimate, and phase shifting by a transmitter frequency error estimate.

12. The method of claim 10 wherein the amplitude error is a function of gain error.

13. The method of claim 10 further comprising generating the receiver phase error estimate.

14. The method of claim 10 wherein the linear equalization occurs in the time domain or the frequency domain.

15. The method of claim 10 wherein carrier frequency offset compensation includes tracking phase and frequency offset between the transmitter and the receiver.

16. The method of claim 10 wherein the method occurs in an application specific integrated circuit or a digital signal processor.

17. A system for correcting error in a direct conversion communication device comprising:
    a direct conversion analog receiver configured to output a real signal and an imaginary signal;
    a receiver quadrature correction module, located at the receiver, configured to process the real signal and the imaginary signal to reduce receiver imbalance and create one or more receiver imbalance corrected signals;
    a transmitter correction module, located at the receiver, configured to process the one or more receiver imbalance corrected signals by dividing one or more receiver imbalance corrected signals by a value, the value is a total of one plus an estimated transmitter amplitude imbalance value and then shifting phase by an estimate of unwanted phase shift introduced by the transmitter.

18. The system of claim 17 wherein the receiver quadrature correction module and the transmitter correction module are embodied on a single integrated circuit.

19. The system of claim 17 further comprising an error estimation module configured to generate one or more error estimates, which are used by the receiver quadrature correction module and the transmitter correction module.

20. A direct conversion error correction circuit comprising:
an integrated circuit configured for processing a real signal and an imaginary signal, the real signal and the imaginary signal received from a transmitter;
a receiver quadrature correction circuit embodied on the integrated circuit at the receiver, the receiver quadrature correction circuit configured to process the real signal and the imaginary signal to reduce receiver imbalance and create one or more receiver imbalance corrected signals; and
a transmitter correction circuit embodied on the integrated circuit at the receiver, the transmitter correction circuit configured to process the one or more receiver imbalance corrected signals by dividing one or more receiver imbalance corrected signals by a total of one plus an estimated transmitter amplitude imbalance value and shifting a phase of the one or more receiver imbalance corrected signals by an estimate of unwanted phase shift introduced by the transmitter.

21. The circuit of claim 20 further comprising an error estimation circuit configured to generate one or more error estimates, which are used by the receiver quadrature correction circuit, the transmitter correction circuit, or both.

22. The circuit of claim 20 wherein the direct conversion error correction circuit is in a receiver operating in accordance with the 802.11 standard.

23. The circuit of claim 20 wherein the real signal and the imaginary signal are in a digital baseband format.

* * * * *